(12) United States Patent
Fong et al.

(10) Patent No.: US 7,698,654 B2
(45) Date of Patent: Apr. 13, 2010

(54) SYSTEMS AND METHODS FOR CO-AXIAL NAVIGATION OF A USER INTERFACE

(75) Inventors: Jeffrey Fong, Seattle, WA (US); Thamer Abanami, Seattle, WA (US); David Franklin, Seattle, WA (US)

(73) Assignee: Microsoft Corporation, Redmond, WA (US)

( * ) Notice: Subject to any disclaimer, the term of this patent is extended or adjusted under 35 U.S.C. 154(b) by 735 days.

(21) Appl. No.: 10/752,240

(22) Filed: Jan. 5, 2004

(65) Prior Publication Data

US 2005/0149551 A1    Jul. 7, 2005

(51) Int. Cl.
G06F 3/048     (2006.01)
G06F 3/14      (2006.01)

(52) U.S. Cl. ............... 715/810; 715/828; 715/841; 715/853; 715/854; 715/864

(58) Field of Classification Search ........... 715/738, 715/700, 716–721, 810–845, 864, 853–855; 707/102
See application file for complete search history.

(56) References Cited

U.S. PATENT DOCUMENTS

| | | | |
|---|---|---|---|
| 5,678,012 A | 10/1997 | Kimmich et al. | 395/327 |
| 5,714,971 A * | 2/1998 | Shalit et al. | 715/804 |
| 5,737,029 A * | 4/1998 | Ohkura et al. | 725/56 |
| 5,907,837 A | 5/1999 | Ferrel et al. | 707/3 |
| 5,933,138 A | 8/1999 | Driskell et al. | 345/333 |
| 6,028,600 A * | 2/2000 | Rosin et al. | 715/718 |
| 6,028,604 A | 2/2000 | Matthews, III et al. | 345/352 |
| 6,189,019 B1 | 2/2001 | Blumer et al. | 707/513 |
| 6,292,188 B1 | 9/2001 | Carlson et al. | 345/357 |
| 6,313,851 B1 | 11/2001 | Matthews, III et al. | 345/718 |

(Continued)

FOREIGN PATENT DOCUMENTS

| | | |
|---|---|---|
| EP | 1 291 754 | 3/2003 |
| WO | WO 01/61443 A2 | 8/2001 |
| WO | WO 01/69363 A2 | 9/2001 |
| WO | WO 03/003186 A1 | 1/2003 |

OTHER PUBLICATIONS

Park, J. and Kim, J. 2000. Effects of contextual navigation aids on browsing diverse Web systems. In Proceedings of the SIGCHI Conference on Human Factors in Computing Systems (The Hague, The Netherlands, Apr. 1-6, 2000). CHI '00. ACM Press, New York, NY, 257-264.*

(Continued)

Primary Examiner—Weilun Lo
Assistant Examiner—William Wong
(74) Attorney, Agent, or Firm—Woodcock Washburn LLP (57) ABSTRACT

Improved systems and methods for navigating media via a user interface, such as a user interface provided on a handheld or portable computing device, are provided. The methods for navigating media of the invention extend the navigation experience by allowing bi-axial context shifts, e.g., with respect to substantially orthogonal directions, allowing a user to conceptually preserve context associated with the navigation experience, context that is lost in one-dimensional hierarchical navigation experiences. In one embodiment, the bi-axial navigation mechanism of the invention includes a drill down twist, i.e., the transformation of a parent list of a parent screen from a vertical list to a horizontal band when moving from the parent screen to the child screen and a horizontal browsing mechanism allowing a user to browse multiple lists using a continuous band of headers.

29 Claims, 7 Drawing Sheets

MUI2

Screen1 (Music Navigation Root)
Songs  Playlists  ARTISTS  Albums  Genres
Artist1
Artist2
Artist3
Artist4
Artist5

MUI2

Screen2
Artist4  Artist5  ARTIST1  Artist2  Artist3
Album1
Album2
Album3
Album4

U.S. PATENT DOCUMENTS

| | | | |
|---|---|---|---|
| 6,344,865 B1 | 2/2002 | Matthews, III et al. | 345/815 |
| 6,438,537 B1 | 8/2002 | Netz et al. | 707/3 |
| 6,463,428 B1* | 10/2002 | Lee et al. | 707/3 |
| 6,469,721 B2 | 10/2002 | Matthews, III et al. | 345/830 |
| 6,496,208 B1 | 12/2002 | Bernhardt et al. | 345/853 |
| 6,538,672 B1* | 3/2003 | Dobbelaar | 715/810 |
| 6,606,082 B1 | 8/2003 | Zuberec et al. | 345/156 |
| 6,690,391 B1* | 2/2004 | Proehl et al. | 715/720 |
| 6,837,789 B2* | 1/2005 | Garahi et al. | 463/29 |
| 6,910,191 B2* | 6/2005 | Segerberg et al. | 715/830 |
| 6,966,037 B2* | 11/2005 | Fredriksson et al. | 715/830 |
| 6,983,426 B1* | 1/2006 | Kobayashi et al. | 715/854 |
| 7,055,104 B1* | 5/2006 | Billmaier et al. | 715/765 |
| 7,080,394 B2* | 7/2006 | Istvan et al. | 725/43 |
| 7,107,531 B2* | 9/2006 | Billmaier et al. | 715/720 |
| 7,107,532 B1* | 9/2006 | Billmaier et al. | 715/720 |
| 2001/0015721 A1* | 8/2001 | Byun et al. | 345/169 |
| 2001/0028369 A1 | 10/2001 | Gallo et al. | 345/848 |
| 2002/0113824 A1* | 8/2002 | Myers, Jr. | 345/810 |
| 2002/0123368 A1* | 9/2002 | Yamadera et al. | 455/556 |
| 2003/0001881 A1* | 1/2003 | Mannheimer et al. | 345/728 |
| 2003/0001898 A1 | 1/2003 | Bernhardson | 345/786 |
| 2003/0001907 A1* | 1/2003 | Bergsten et al. | 345/853 |
| 2003/0028885 A1* | 2/2003 | Wilcox et al. | 725/60 |
| 2003/0046700 A1* | 3/2003 | Wilcox et al. | 725/60 |
| 2003/0081011 A1* | 5/2003 | Sheldon et al. | 345/838 |
| 2003/0169302 A1* | 9/2003 | Davidsson et al. | 345/810 |
| 2003/0218637 A1* | 11/2003 | Sloo et al. | 345/810 |
| 2003/0234804 A1* | 12/2003 | Parker et al. | 345/719 |
| 2004/0055446 A1* | 3/2004 | Robbin et al. | 84/615 |
| 2004/0175159 A1* | 9/2004 | Oetzel et al. | 386/125 |
| 2004/0233238 A1* | 11/2004 | Lahdesmaki | 345/810 |
| 2005/0114796 A1* | 5/2005 | Bast | 715/856 |
| 2005/0149873 A1* | 7/2005 | Guido et al. | 715/734 |
| 2006/0031916 A1* | 2/2006 | Colter et al. | 725/135 |
| 2006/0127036 A1* | 6/2006 | Inoue et al. | 386/68 |
| 2006/0136246 A1* | 6/2006 | Tu | 705/1 |

OTHER PUBLICATIONS

Cai, G., "GeoVIBE: a visual interface for geographic digital libraries," *Visual Interfaces to Digital Libraries*, Börner and Ched (Eds.), 2002, 2539, 171-187.

Dieberger, A. et al., Exploratory navigation in large multimedia documents using Context Lenses, *Proceedings of the 35th Annual Hawaii Int'l Conference on System Sciences*, Jan. 7-10, 2002, Big Island, Hawaii, 911-917.

Huang, A.H., "Effects of multimedia on document browsing and navigation: an exploratory empirical investigation," *Information & Management*, 2003, 41(2), 189-198.

Kopetzky, T. et al., "Visual preview for link traversal on the World Wide Web," *Computer Networks*, 1999, 31(11-16), 1525-1532.

Lai, W. et al., "Designing effective user interfaces for Web courseware," *Concurrent Engineering-Research and Applications*, 2001, 9(2), 105-110.

Nemec, V. et al., "Adaptive navigation of visually impaired users in a virtual environment on the World Wide Web," *Universal Access. Theoretical Perspectives, Practice, and Experience. 7th ERCIM Int'l Workshop on User Interfaces for All*, Oct. 24-25, 2002, Paris, France, 68-79.

Sabol, V. et al., "Applications of a lightweight, Web-based retrieval, clustering, and visualisation framework," *Practical Aspects of Knowledge Management. 4th Int'l Conference, PAKM 2002*, Dec. 2-3, 2002, Vienna, Austria, 359-368.

Schilit, B.N. et al., "Web interaction using very small Internet devices," *IEEE Distributed Systems Online*, 2002, 3(10), 13 pages.

Ukelson, J.P. et al., "User Navigation in Computer Applications," *IEEE Trans. Software Engineering*, 1993, 19(3), 297-306.

\* cited by examiner

SYSTEMS AND METHODS FOR CO-AXIAL NAVIGATION OF A USER INTERFACE

COPYRIGHT NOTICE AND PERMISSION

A portion of the disclosure of this patent document may contain material that is subject to copyright protection. The copyright owner has no objection to the facsimile reproduction by anyone of the patent document or the patent disclosure, as it appears in the Patent and Trademark Office patent files or records, but otherwise reserves all copyright rights whatsoever. The following notice shall apply to this document: Copyright ©2003, Microsoft Corp.

NOTICE OF TRADEMARK USE

The names of actual recording artists referred to herein are trademarks of their respective owners. No association with any recording artist is intended or should be inferred.

FIELD OF THE INVENTION

This invention relates to improved systems and methods for navigating a user interface. More particularly, the invention relates to systems and methods for enhancing a media navigation experience by enhancing the way in which media can be navigated via co-axial manipulation of presentation elements of a user interface.

BACKGROUND

Along with increased availability of digital media of all types and varieties, devices for rendering the media have proliferated as well. And yet, for all of such proliferation, the hierarchical model applied to the user interface for navigating the media has remained largely the same. This is of particular disadvantage to those users with a great quantity of media through which it is desirable to navigate. Under the traditional hierarchical model for navigating media, a user first selects a top level category, such as "Albums," or "Artists," or "All Songs." A list is associated with the top level category, and the user selects an element from the list. Then, there may be one or more sub-categories associated with the element selected, all of equal hierarchical weight. For instance, in the case of the selection of a particular Album from a list of Albums, a list of songs associated with the selected Album appears for the user's further selection. Since generally, a "song" is the atomic element of music navigation, there is no further sub-navigation, and selection of the song results in its being rendered, or otherwise selected for some operation. This type of navigation is not that much different than the navigation of a traditional hierarchical file management system, wherein a folder is selected, and then sub-folders of equal hierarchical weight appear, and sub-folders can be selected with similar drilling down until atomic elements, such as files, that can not be subdivided further are reached.

Figure 1A:
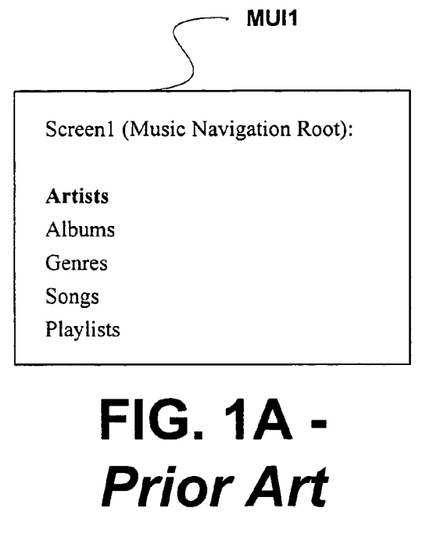
FIGS. 1A to 1D illustrate an exemplary prior art media navigation user interface experience.
Figure 1B:
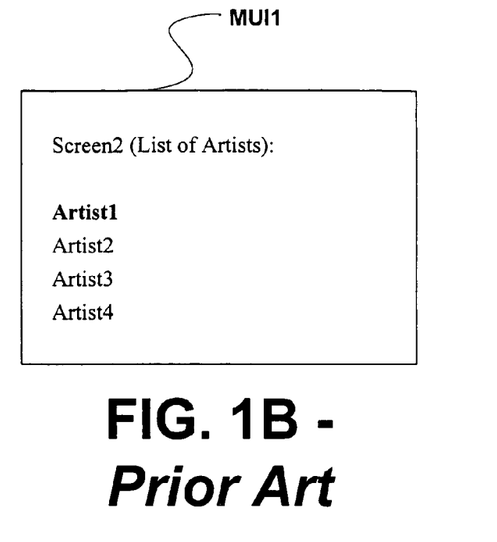
Figure 1C:
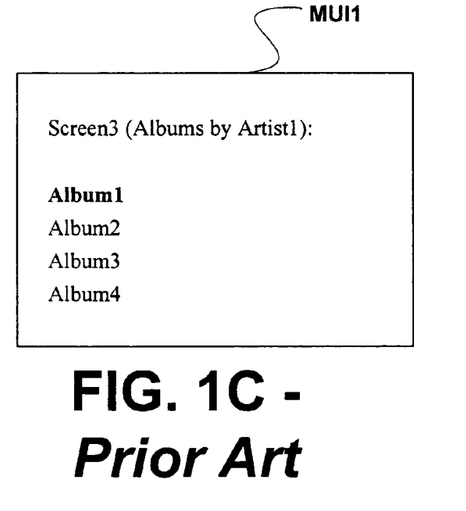
Figure 1D:
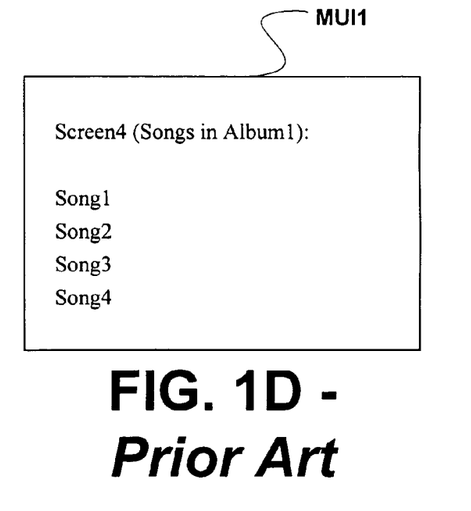

For a particular example of a traditional music hierarchy navigation of a user interface, FIG. 1A illustrates a navigation starting with the "Artist," users navigate on a screen by screen basis from FIG. 1A to FIG. 1D. The bolded element of the media user interface MUI1 represents a selected element, or an element which is to be selected to produce the next screen. Thus, in the traditional case, after a user selected "Artist" in the top-level screen, a list of Artists appears in FIG. 1B, reflecting the user's choice. After the user selects Artist1 from the list of Artists, a list of Albums associated with Artist1 appears in FIG. 1C. From that list of Albums, a user may select an Album of choice, in this case Album1, and as a result, finally, in FIG. 1D, a list of songs associated with the Album is displayed. A selection from the list of FIG. 1D typically results in the playing of the song.

With a hierarchical menu such as this, a user moves forward through and backs out of the various levels of hierarchy in order to reach a particular song or set of songs. Essentially, navigation is unidirectional, i.e., navigation is either moving towards the more specific, or the more general. While this model works alright when a user is navigating a manageable number of songs, this model is too rigid, static and inflexible when navigating thousands and thousands of songs. Finding any particular atomic element, e.g., a song, may prove too cumbersome and frustrate a user. This is particularly true when the device is a handheld device with limited screen real estate for the user to see at one time. Representing such deep hierarchies on a mobile device screen or even on a Television from 10 feet away can post a challenge due to the number of steps involved, and the unavailability of the previous step for reference. When only a handful of songs can be displayed to a user at a time due to the size of the device, one can appreciate the need for a top notch user interface experience.

Another technique for finding a particular media element amidst a vast quantity of media is to simply search upon a name associated with the desired media element. For instance, the user may not know the name of a desired song, but the user may know the artist or the album. By text searching on the media store, a set of candidates can be displayed to the user. Regretfully, this is an error prone process, and requires the user to know something about the targeted media. This is also not prone to easily displaying a related set of songs desired by the user. Additionally, on a small device, such as an Moving Pictures Experts Group (MPEG) Audio Layer 3 (MP3) player or a handheld Digital Versatile Disc (DVD) player, the means for inputting into the device may itself be limited, i.e., the device may not have a keyboard, and if it does, the keyboard keys tend to be small, and thus prone to slow, error prone entry. Accordingly, it is clear that text searching is not an adequate method of searching for and playing media via a user interface.

As a consequence, there is a need for a rich user experience when navigating media on a user interface of a computing device. More particularly, there is need for an improved user interface experience for media on a handheld device with limited input and output representational capacities, e.g., due to a limited screen resolution or size, or due to limited input device capabilities.

SUMMARY OF THE INVENTION

In consideration of the above-identified shortcomings of the art, the present invention provides improved systems and methods for navigating media via a user interface, such as a user interface provided on a handheld or portable computing device. The methods for navigating media of the invention extend the navigation experience by allowing bi-axial context shifts, e.g., with respect to substantially orthogonal directions, allowing a user to conceptually preserve context associated with the navigation experience, context that is lost in one-dimensional hierarchical navigation experiences. In one embodiment, the bi-axial navigation mechanism of the invention includes a drill down twist, i.e., the transformation of a parent list of a parent screen from a vertical list to a horizontal band when moving from the parent screen to the child screen and a horizontal browsing mechanism allowing a user to browse multiple lists using a continuous band of headers.

Other advantages and features of the invention are described below.

BRIEF DESCRIPTION OF THE DRAWINGS

The systems and methods for navigating a user interface in accordance with the present invention are further described with reference to the accompanying drawings in which.

DETAILED DESCRIPTION OF THE INVENTION

Overview

As mentioned, pure hierarchy-based navigation is a challenge in mobile and entertainment focused user interfaces. When hierarchies become too deep due to the nature of the media (lots of characteristics into which to drill) or due to the sheer quantity of media involved, the experience grows cumbersome and can become a liability. Accordingly, the bi-axial navigation of the present invention provides a system for improving the experience of hierarchical navigation.

In various embodiments of the invention, the co-axial navigation techniques include a Drill Down Twist and Horizontal Browsing of multiple lists using a continuous band of headers. The drill down twist is the transformation of a parent list from a vertical list to a horizontal band, or vice versa, when moving to the next screen. The selected item from the previous screen's vertical list becomes the selected horizontal header whose child list is shown on a new screen, or vice versa. With Horizontal Browsing of multiple lists using a continuous band of headers, moving to the next item in the horizontal header band allows the user to view the child list for that header without having to leave the screen. With the co-axial, or bi-axial, user interface of the invention, in addition to offering flexible navigation of the parent list and the child list on one screen, the user can use left and right navigation to change the list they are viewing without leaving the screen thus reducing the cognitive distance required of the user by the UI.

Exemplary Networked and Distributed Environments

One of ordinary skill in the art can appreciate that the invention can be implemented in connection with any computer or other client or server device, which can be deployed as part of a computer network, or in a distributed computing environment. In this regard, the present invention pertains to any computer system or environment having any number of memory or storage units, and any number of applications and processes occurring across any number of storage units or volumes, which may be used in connection with processes for navigating media in accordance with the present invention. The present invention may apply to an environment with server computers and client computers deployed in a network environment or distributed computing environment, having remote or local storage. The present invention may also be applied to standalone computing devices, having programming language functionality, interpretation and execution capabilities for generating, receiving and transmitting information in connection with remote or local services. Media storage and retrieval is particularly relevant to those computing devices operating in a network or distributed computing environment, as sources for disparate types of media arise from many different places in a computing environment that is interconnected via a plurality of networks and thus the methods for navigating media in accordance with the present invention can be applied with great efficacy in those environments.

Distributed computing provides sharing of computer resources and services by exchange between computing devices and systems. These resources and services include the exchange of information, cache storage and disk storage for files. Distributed computing takes advantage of network connectivity, allowing clients to leverage their collective power to benefit the entire enterprise. In this regard, a variety of devices may have applications, objects or resources that may be implicated by the methods for navigating of the invention.

Figure 2A:
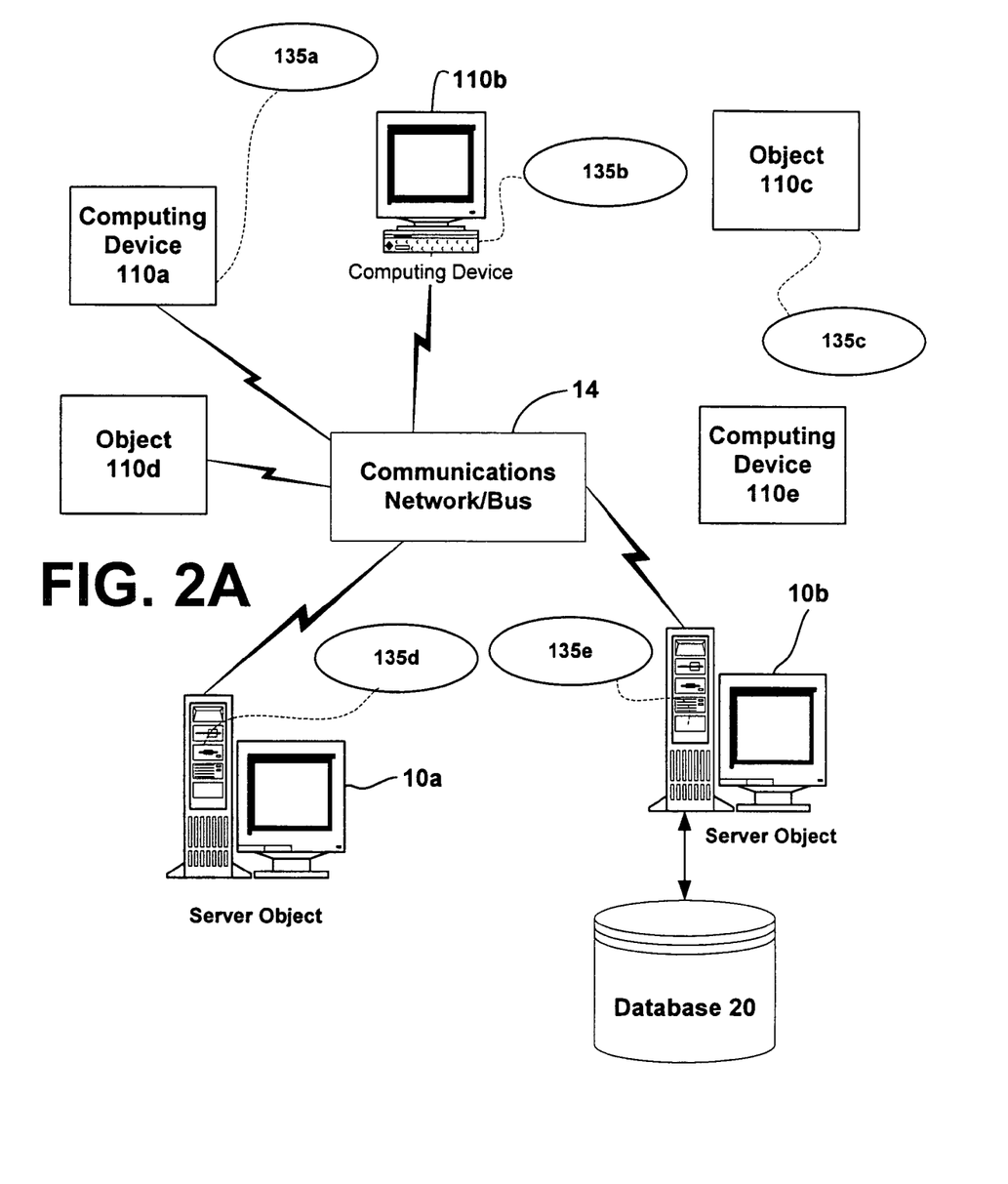
FIG. 2A is a block diagram representing an exemplary network environment having a variety of computing devices in which the present invention may be implemented.

FIG. 2A provides a schematic diagram of an exemplary networked or distributed computing environment. The distributed computing environment comprises computing objects 10a, 10b, etc. and computing objects or devices 110a, 110b, 110c, etc. These objects may comprise programs, methods, data stores, programmable logic, etc. The objects may comprise portions of the same or different devices such as Programmable Digital Assistants (PDA's), audio/video devices, MP3 players and other media rendering devices, personal computers, etc. Each object can communicate with another object by way of the communications network 14. This network may itself comprise other computing objects and computing devices that provide services to the system of FIG. 2A, and may itself represent multiple interconnected networks. In accordance with an aspect of the invention, each object 10a, 10b, etc. or 110a, 110b, 110c, etc. may contain an application that might make use of an Application Programming Interface (API) or other object, software, firmware and/or hardware, in connection with the processes for navigating media in accordance with the invention.

It can also be appreciated that an object, such as 110c, may be hosted on another computing device 10a, 10b, etc. or 110a, 110b, etc. Thus, although the physical environment depicted may show the connected devices as computers, such illustration is merely exemplary and the physical environment may alternatively be depicted or described comprising various digital devices such as PDAs, televisions, MP3 players, personal media players, etc., software objects such as interfaces, Component Object Model (COM) objects and the like.

There are a variety of systems, components, and network configurations that support distributed computing environments. For example, computing systems may be connected together by wired or wireless systems, by local networks or widely distributed networks. Currently, many of the networks are coupled to the Internet, which provides an infrastructure for widely distributed computing and encompasses many different networks. Any of the infrastructures may be used for exemplary communications made incident to navigating media according to the present invention.

In home networking environments, there are at least four disparate network transport media that may each support a unique protocol, such as Power line, data (both wireless and wired), voice (e.g., telephone) and entertainment media. Most home control devices such as light switches and appliances may use power lines for connectivity. Data Services may enter the home as broadband (e.g., either Digital Subscriber Line (DSL) or Cable modem) and are accessible within the home using either wireless (e.g., HomeRF or 802.11x) or wired (e.g., Home Phoneline Networking Alliance (HomePNA), Cat 5, Ethernet, even power line) connectivity. Voice traffic may enter the home either as wired (e.g., Cat 3) or wireless (e.g., cell phones) and may be distributed within the home using Cat 3 wiring. Entertainment media, or other graphical data, may enter the home either through satellite or cable and is typically distributed in the home using coaxial cable. IEEE 1394 and Digital Visual Interface (DVI) are also digital interconnects for clusters of media devices. All of these network environments and others that may emerge as protocol standards may be interconnected to form a network, such as an intranet, that may be connected to the outside world by way of the Internet. In short, a variety of disparate sources exist for the storage and transmission of data, and consequently, moving forward, computing devices will require ways of sharing data, such as data accessed or utilized incident to program objects, which make use of the media navigation experience provided in accordance with the present invention.

The Internet commonly refers to the collection of networks and gateways that utilize the Transmission Control Protocol/Internet Protocol (TCP/IP) suite of protocols, which are well-known in the art of computer networking. The Internet can be described as a system of geographically distributed remote computer networks interconnected by computers executing networking protocols that allow users to interact and share information over the network(s). Because of such widespread information sharing, remote networks such as the Internet have thus far generally evolved into an open system for which developers can design software applications for performing specialized operations or services, essentially without restriction.

A network infrastructure enables a host of network topologies such as client/server, peer-to-peer, or hybrid architectures. The "client" is a member of a class or group that uses the services of another class or group to which it is not related. Thus, in computing, a client is a process, i.e., roughly a set of instructions or tasks, that requests a service provided by another program. The client process utilizes the requested service without having to "know" any working details about the other program or the service itself. In a client/server architecture, particularly a networked system, a client is usually a computer that accesses shared network resources provided by another computer, e.g., a server. In the example of FIG. 2A, computers 110a, 110b, etc. can be thought of as clients and computers 10a, 10b, etc. can be thought of as the server where server 10a, 10b, etc. maintains the data that is then replicated in the client computers 110a, 110b, etc., although any computer can be considered a client, a server, or both, depending on the circumstances. Any of these computing devices may be processing data or requesting services or tasks that may implicate the navigation techniques of the invention.

A server is typically a remote computer system accessible over a remote or local network, such as the Internet. The client process may be active in a first computer system, and the server process may be active in a second computer system, communicating with one another over a communications medium, thus providing distributed functionality and allowing multiple clients to take advantage of the information-gathering capabilities of the server. Any software objects utilized pursuant to the navigation techniques of the invention may be distributed across multiple computing devices or objects.

Client(s) and server(s) communicate with one another utilizing the functionality provided by protocol layer(s). For example, HyperText Transfer Protocol (HTTP) is a common protocol that is used in conjunction with the World Wide Web (WWW), or "the Web." Typically, a computer network address, such as an Internet Protocol (IP) address or other reference such as a Universal Resource Locator (URL), can be used to identify the server or client computers to each other. The network address can be referred to as a URL address. Communication can be provided over a communications medium, e.g., client(s) and server(s) may be coupled to one another via TCP/IP connection(s) for high-capacity communication.

Thus, FIG. 2A illustrates an exemplary networked or distributed environment, with a server in communication with client computers via a network/bus, in which the present invention may be employed. In more detail, a number of servers 10a, 10b, etc., are interconnected via a communications network/bus 14, which may be a Local Area Network (LAN), Wide Area Network (WAN), intranet, the Internet, etc., with a number of client or remote computing devices 110a, 110b, 110c, 110d, 110e, etc., such as a portable computer, handheld computer, thin client, networked appliance, or other device, such as a Video Cassette Recorder (VCR), Television (TV), oven, light, heater and the like in accordance with the present invention. It is thus contemplated that the present invention may apply to any computing device in connection with which it is desirable to implement an improved navigation experience.

In a network environment in which the communications network/bus 14 is the Internet, for example, the servers 10a, 10b, etc. can be Web servers with which the clients 110a, 110b, 110c, 110d, 110e, etc. communicate via any of a number of known protocols such as HTTP. Servers 10a, 10b, etc. may also serve as clients 110a, 110b, 110c, 110d, 110e, etc., as may be characteristic of a distributed computing environment.

Communications may be wired or wireless, where appropriate. Client devices 110a, 110b, 110c, 110d, 110e, etc. may or may not communicate via communications network/bus 14, and may have independent communications associated therewith. For example, in the case of a TV or VCR, there may or may not be a networked aspect to the control thereof. Each client computer 110a, 110b, 110c, 110d, 110e, etc. and server computer 10a, 10b, etc. may be equipped with various application program modules or objects 135 and with connections or access to various types of storage elements or objects, across which files or data streams may be stored or to which portion(s) of files or data streams may be downloaded, transmitted or migrated. Any one or more of computers 10a, 10b, 110a, 110b, etc. may be responsible for the maintenance and updating of a database 20 or other storage element, such as a database or memory 20 for storing data processed according to the invention. Thus, the present invention can be utilized in a computer network environment having client computers 110a, 110b, etc. that can access and interact with a computer network/bus 14 and server computers 10a, 10b, etc. that may interact with client computers 110a, 110b, etc. and other like devices, and databases 20.

Exemplary Computing Device

Figure 2B:
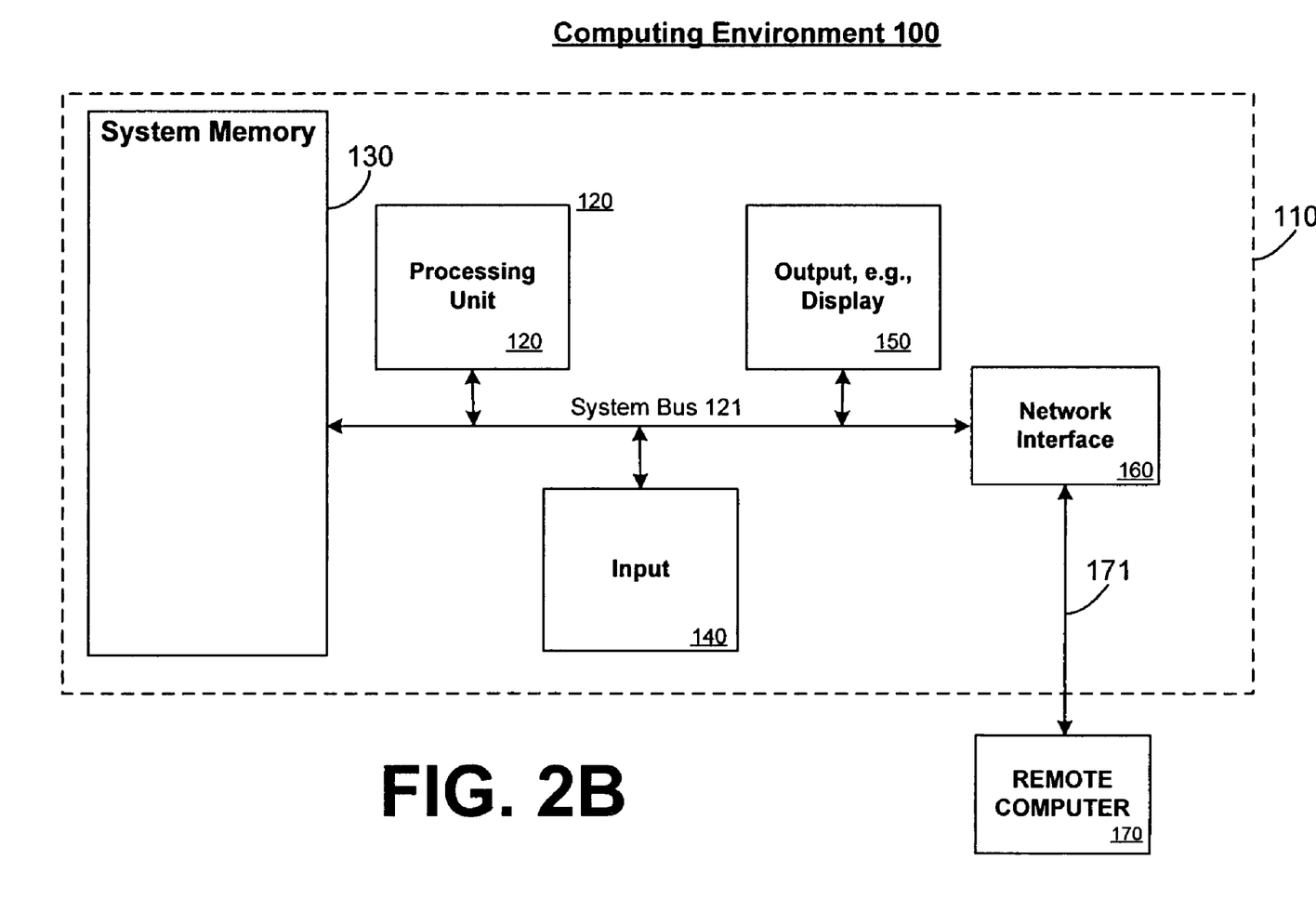
FIG. 2B is a block diagram representing an exemplary non-limiting computing device in which the present invention may be implemented.

FIG. 2B and the following discussion are intended to provide a brief general description of a suitable computing environment for a media device in connection with which the techniques of the invention can be applied with great efficacy. It should be understood, however, that handheld, portable and other computing devices and computing objects of all kinds are contemplated for use in connection with the present invention, i.e., anywhere that a device may wish to provide a rich media navigation experience for searching or discovering media. The below general purpose computer described below is but one example, and the present invention may be implemented with any client having network/bus interoperability and interaction. Thus, the present invention may be implemented in an environment of networked hosted services in which very little or minimal client resources are implicated, e.g., a networked environment in which the client device serves merely as an interface to the network/bus, such as an object placed in an appliance. In essence, anywhere that data may be stored or from which data may be retrieved or transmitted to another computer is a desirable, or suitable, environment for operation of the rich media navigation experience provided by the invention.

Although not required, the invention can partly be implemented via an operating system, for use by a developer of services for a device or object, and/or included within application software that operates in connection with the component(s) of the invention. Software may be described in the general context of computer-executable instructions, such as program modules, being executed by one or more computers, such as client workstations, servers or other devices. Those skilled in the art will appreciate that the invention may be practiced with other computer system configurations and protocols.

FIG. 2B thus illustrates an example of a suitable computing system environment 100 in which the invention may be implemented, although as made clear above, the computing system environment 100 is only one example of a suitable computing environment for a device and is not intended to suggest any limitation as to the scope of use or functionality of the invention. Neither should the computing environment 100 be interpreted as having any dependency or requirement relating to any one or combination of components illustrated in the exemplary operating environment 100. Moreover, while exemplary embodiments are described herein with respect to the navigation of media, such as songs, or movies, the invention is not so limited. Any search experience that implies multiple search criteria according to different categories may benefit from the navigation experience of the invention.

With reference to FIG. 2B, an exemplary device for implementing the invention includes a general purpose computing device in the form of a computer 110. Components of computer 110 may include, but are not limited to, a processing unit 120, a system memory 130, and a system bus 121 that couples various system components including the system memory to the processing unit 120. The system bus 121 may be any of several types of bus structures including a memory bus or memory controller, a peripheral bus, and a local bus using any of a variety of bus architectures.

Computer 110 typically includes a variety of computer readable media. Computer readable media can be any available media that can be accessed by computer 110. By way of example, and not limitation, computer readable media may comprise computer storage media and communication media. Computer storage media includes both volatile and nonvolatile, removable and non-removable media implemented in any method or technology for storage of information such as computer readable instructions, data structures, program modules or other data. Computer storage media includes, but is not limited to, Random Access Memory (RAM), Read Only Memory (ROM), Electrically Erasable Programmable Read Only Memory (EEPROM), flash memory or other memory technology, Compact Disc Read Only Memory (CDROM), digital versatile disks (DVD) or other optical disk storage, magnetic cassettes, magnetic tape, magnetic disk storage or other magnetic storage devices, or any other medium which can be used to store the desired information and which can be accessed by computer 110. Communication media typically embodies computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, Radio Frequency (RF), infrared and other wireless media. Combinations of any of the above should also be included within the scope of computer readable media.

The system memory 130 may include computer storage media in the form of volatile and/or nonvolatile memory such as read only memory (ROM) and/or random access memory (RAM). A basic input/output system (BIOS), containing the basic routines that help to transfer information between elements within computer 110, such as during start-up, may be stored in memory 130. Memory 130 typically also contains data and/or program modules that are immediately accessible to and/or presently being operated on by processing unit 120. By way of example, and not limitation, memory 130 may also include an operating system, application programs, other program modules, and program data.

The computer 110 may also include other removable/non-removable, volatile/nonvolatile computer storage media. For example, computer 110 could include a hard disk drive that reads from or writes to non-removable, nonvolatile magnetic media, a magnetic disk drive that reads from or writes to a removable, nonvolatile magnetic disk, and/or an optical disk drive that reads from or writes to a removable, nonvolatile optical disk, such as a CD-ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM and the like. A hard disk drive is typically connected to the system bus 121 through a non-removable memory interface such as an interface, and a magnetic disk drive or optical disk drive is typically connected to the system bus 121 by a removable memory interface, such as an interface.

A user may enter commands and information into the computer 110 through input devices such as a keyboard and pointing device, commonly referred to as a mouse, trackball, pressing buttons or selecting other partially mechanical input components, touch pad, pen or stylus, etc. Other input devices may include a microphone, joystick, game pad, satellite dish, scanner, or the like. These and other input devices are often connected to the processing unit 120 through user input 140 and associated interface(s) that are coupled to the system bus 121, but may be connected by other interface and bus structures, such as a parallel port, game port or a universal serial bus (USB). A graphics subsystem may also be connected to the system bus 121. A monitor or other type of display device is also connected to the system bus 121 via an interface, such as output interface 150, which may in turn communicate with video memory. In addition to a monitor, computers may also include other peripheral output devices such as speakers and a printer, which may be connected through output interface 150.

The computer 110a may operate in a networked or distributed environment using logical connections to one or more other remote computers, such as remote computer 170, which may in turn have media capabilities different from device 110. The remote computer 170 may be a personal computer (PC), a server, a router, a network PC, a peer device or other common network node, or any other remote media consumption or transmission device, and may include any or all of the elements described above relative to the computer 110. The logical connections depicted in FIG. 2C include a network 171, such local area network (LAN) or a wide area network (WAN), but may also include other networks/buses. Such networking environments are commonplace in homes, offices, enterprise-wide computer networks, intranets and the Internet.

When used in a LAN networking environment, the computer 110 is connected to the LAN 171 through a network interface or adapter. When used in a WAN networking environment, the computer 110 typically includes a modem or other means for establishing communications over the WAN, such as the Internet. A modem, which may be internal or external, may be connected to the system bus 121 via the user input interface of input 140, or other appropriate mechanism. In a networked environment, program modules depicted relative to the computer 110, or portions thereof, may be stored in a remote memory storage device. It will be appreciated that the network connections shown and described are exemplary and other means of establishing a communications link between the computers may be used.

Exemplary Distributed Computing Frameworks or Architectures

Various distributed computing frameworks have been and are being developed in light of the convergence of personal computing and the Internet. Individuals and business users alike are provided with a seamlessly interoperable and Web-enabled interface for applications and computing devices, making computing activities increasingly Web browser or network-oriented.

For example, MICROSOFT®'s managed code platform, i.e., .NET, includes servers, building-block services, such as Web-based data storage and downloadable device software. Generally speaking, the .NET platform provides (1) the ability to make the entire range of computing devices work together and to have user information automatically updated and synchronized on all of them, (2) increased interactive capability for Web pages, enabled by greater use of Extensible Markup Language (XML) rather than HyperText Markup Language (HTML), (3) online services that feature customized access and delivery of products and services to the user from a central starting point for the management of various applications, such as e-mail, for example, or software, such as Office .NET, (4) centralized data storage, which increases efficiency and ease of access to information, as well as synchronization of information among users and devices, (5) the ability to integrate various communications media, such as e-mail, faxes, and telephones, (6) for developers, the ability to create reusable modules, thereby increasing productivity and reducing the number of programming errors and (7) many other cross-platform and language integration features as well.

While some exemplary embodiments herein are described in connection with software residing on a computing device, one or more portions of the invention may also be implemented via an operating system, application programming interface (API) or a "middle man" object, a control object, hardware, firmware, intermediate language instructions or objects, etc., such that the methods for navigating media may be included in, supported in or accessed via all of the languages and services enabled by managed code, such as .NET code, and in other distributed computing frameworks as well.

Systems and Methods for Providing Co-Axial Navigation

As described above, the present invention enables a rich user interface for media navigation by providing co-axial navigation. FIGS. 3A-3D illustrate an exemplary coaxial navigation experience for a media user interface MUI2 in accordance with the invention. In FIGS. 3A-3D, for illustrative purposes, a category of a screen in ALL CAPITAL LETTERS is the active header, and a bolded element represents a selected vertical list item from the list associated with the active header. For instance, in FIG. 3A, a music navigation root screen Screen1 includes a first level list for active selection including headers Songs, Playlists, Artists, Albums and Genres, wherein ARTISTS is the category selected as the active header, and Artist1 has been selected from the list of ARTISTS. One can appreciate a first kind of co-axial navigation that the invention provides, namely, that by navigating Left-Right, a user can switch between active headers, and by navigating Up-Down, a user can switch between items associated with the active header.

Figure 3A:
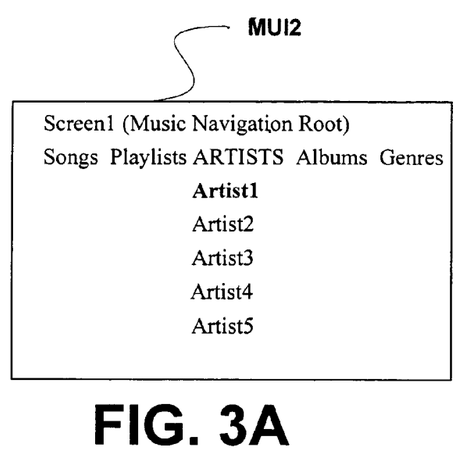
FIGS. 3A to 3D illustrate exemplary aspects of media navigation user interface experiences in accordance with the invention.
Figure 3B:
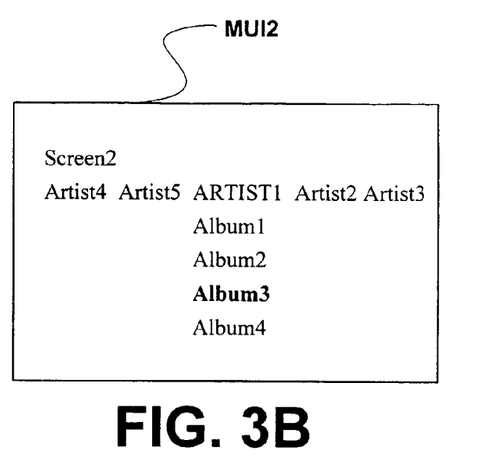
Figure 3C:
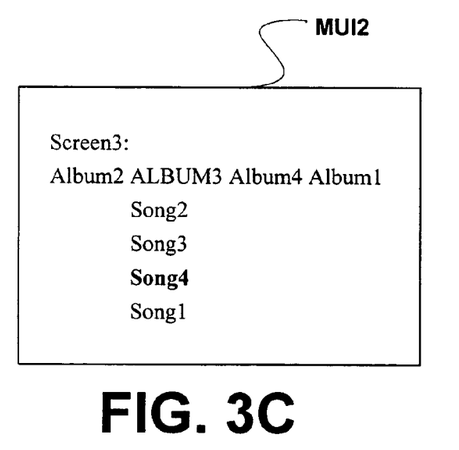
Figure 3D:
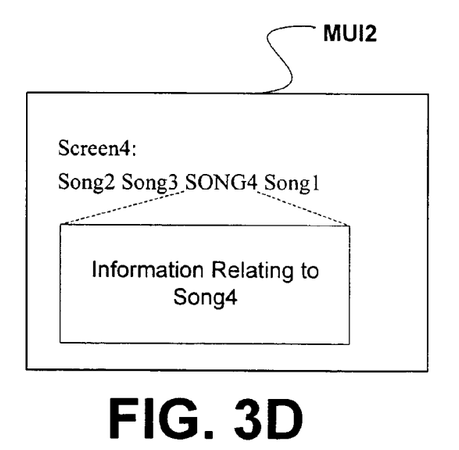

FIG. 3B illustrates the advantage of the navigation experience of the invention. Once Artist1 is selected, the media user interface MUI2 presents Screen2 in response that takes the vertical list of artists from Screen1, and represents them horizontally as the new headers. In FIG. 3B, Left-Right navigation switches between Artists, preserving the context from which the presentation of Screen2 came. The active header ARTIST1 of FIG. 3B has an associated vertical list of Albums which are related to the artist ARTIST1. Up-down vertical navigation switches between these Albums. In FIG. 3B, album Album3 is selected, thereby initiating the presentation of Screen3 of FIG. 3C. One can see in Screen3 that once again the previous vertical list of Albums now becomes the horizontal list of headers between which the user can navigate. In the case of the selection of Album3 in FIG. 3B, as a result, in FIG. 3C, the songs associated with ALBUM3 are displayed vertically. Switching to ALBUM4, for instance, would then display the songs associated with ALBUM4, and so on. In this fashion, the invention maintains the context as a user navigates media, by redisplaying in a horizontal context, the selection of an element from a vertical list. In this regard, whether from horizontal to vertical, or from vertical to horizontal, or from a first orientation to a second orientation, the advantage of the invention is the redisplay of the context of a previous list selection by representing it in a different orientation that can still be navigated by the user. In one non-limiting embodiment, once the atomic elements, e.g., songs, are reached, and a user selects a song from a vertical list, the songs are repositioned horizontally, as in FIG. 3D with the selected song, in this case SONG4, as the active header. Once selected, further information can be displayed about the atomic element in an information display box, e.g., a picture associated with the album, information about the year produced, etc.

Figure 4:
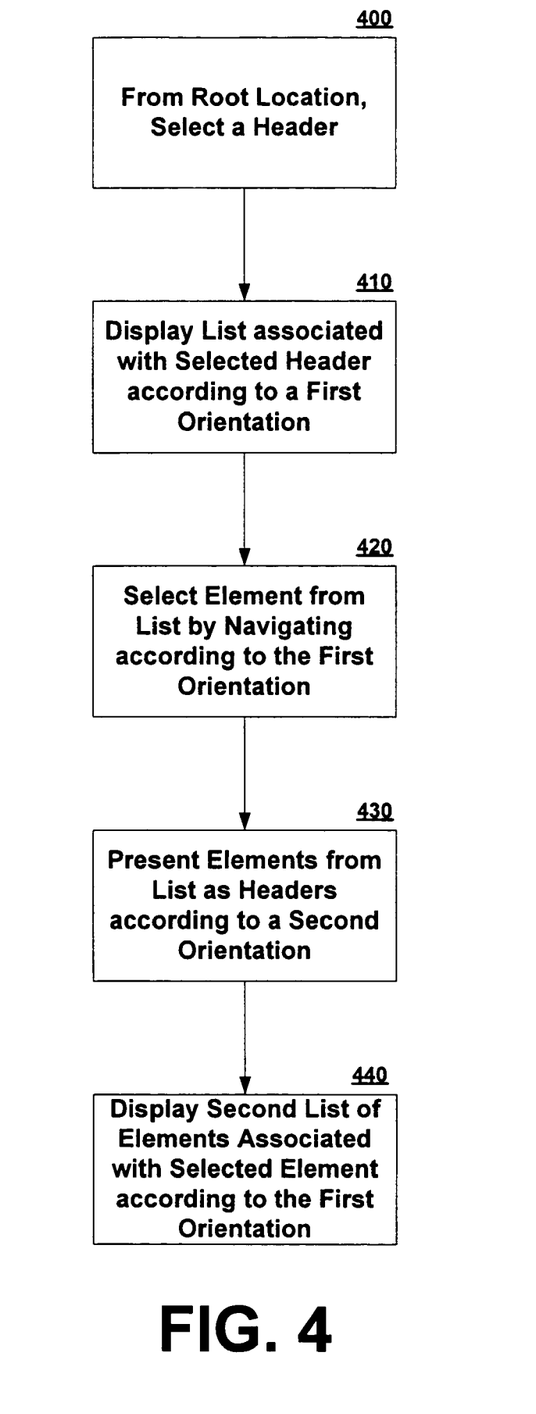
FIG. 4 is an exemplary flow diagram associated with the navigation techniques of the present invention.

FIG. 4 shows an exemplary flow diagram generally applied to produce the results illustrated in FIGS. 3A-3D. At 400, a start location, such as a root menu location with top level categories or headers, is displayed. A first list is displayed at 410, the first list being associated with a selected header from the headers displayed at 400. The first list is displayed according to a first orientation. The first orientation may be vertical, for instance, as illustrated in FIGS. 3A-3D, and for instance, in Screen1, the list includes Artist1, Artist2, Artist3, Artist4 and Artist5. At 420, an element is selected from the first list by navigating in accordance with the first orientation. Then, at 430, the elements from the first list become the new headers for a new presentation screen according to a second orientation. In FIGS. 3A-3D, for instance, the elements from the first list become the new headers and are displayed horizontally (from vertical), and for instance, in Screen2, the new headers become Artist1, Artist2, Artist3, Artist4 and Artist5, i.e., the elements from the list of FIG. 3A, in an order determined by a selection from that list. At 440, a second list is displayed corresponding to the selected header of the display, as per the selection of the element at 420, e.g., in Screen2, the second list is Album1, Album2, Album3 and Album4. The second list is displayed according to the first orientation. This process can then be repeated, i.e., the current headers are according to the second orientation, and the second list becomes the first list in the above-described process. Once again, a selection of an element from the list causes a drill down twist, wherein the vertical list elements are repositioned horizontally as the new header elements. "Drill Down" implies going from the more general to the more specific, for instance, to arrive at a song from an album, and "Twist" implies the axial shift of information.

In addition to offering flexible navigation of a parent list and a child list on one screen, the user can use left and right navigation to change the list being viewed without leaving the screen, thus reducing the cognitive distance the user is required to take in the UI.

In this regard, the invention provides a drill down twist and horizontal browsing of multiple lists. The drill down twist refers to the transformation of the parent list from a vertical list to a horizontal band when moving to the next screen, as illustrated in FIGS. 3A-3D. The selected item from the previous screen's vertical list becomes the selected horizontal header whose child list is shown on the new screen. The invention also enables horizontal browsing of multiple lists using a continuous band of headers. Moving to the next item in the horizontal header band allows the child list for that header to be viewed without having to leave the screen.

The invention provides bands of lists. With the invention, usually a list component is not alone, i.e., it has parallel list components on its left and right. Together this collection of list components serves as a single UI component: a band of lists. In exemplary non-limiting embodiments, the band is arranged horizontally as a circular list and the user moves between lists using the LEFT and RIGHT buttons.

The lists in the band are related, and this relationship is always suggested (or explicitly demonstrated) in the screen that took the user to the band of lists. For example, if the user selects an album by an Artist named Beck, the user will be taken to a screen showing the tracks on that album—the list containing those tracks is one list in a band of lists where each list shows the tracks on a different Beck album. In this case (and in numerous places in the UI), the items in the "Albums by Beck" list, become the lists in the band of lists, that is, the contents of the original list is "twisted" to become the list headings in the resulting band of lists.

Figure 5A:
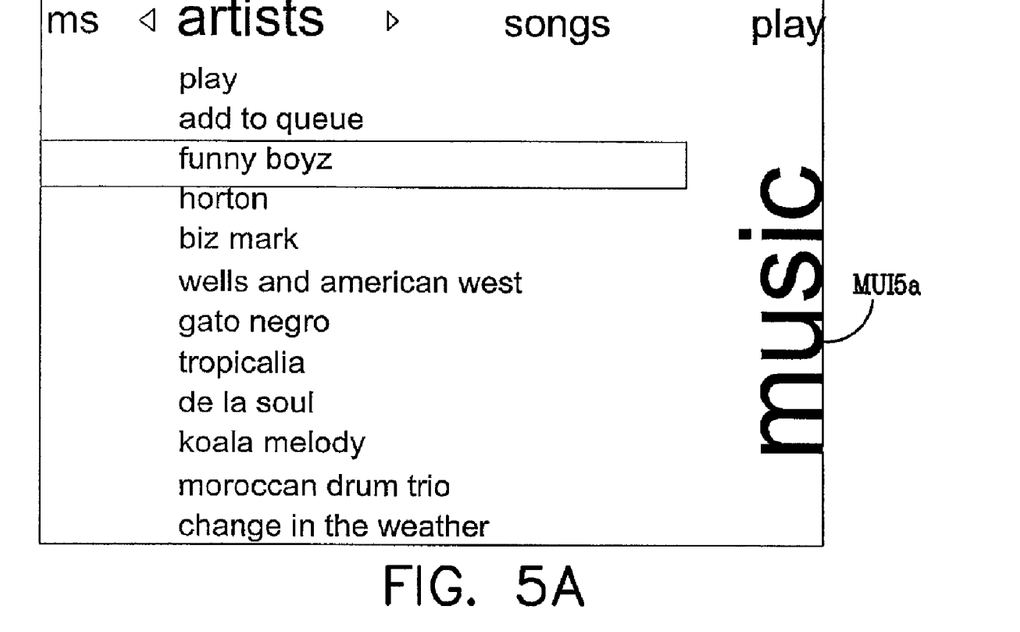
FIGS. 5A and 5B are exemplary screenshots of an embodiment of the user interface of the invention.
Figure 5B:
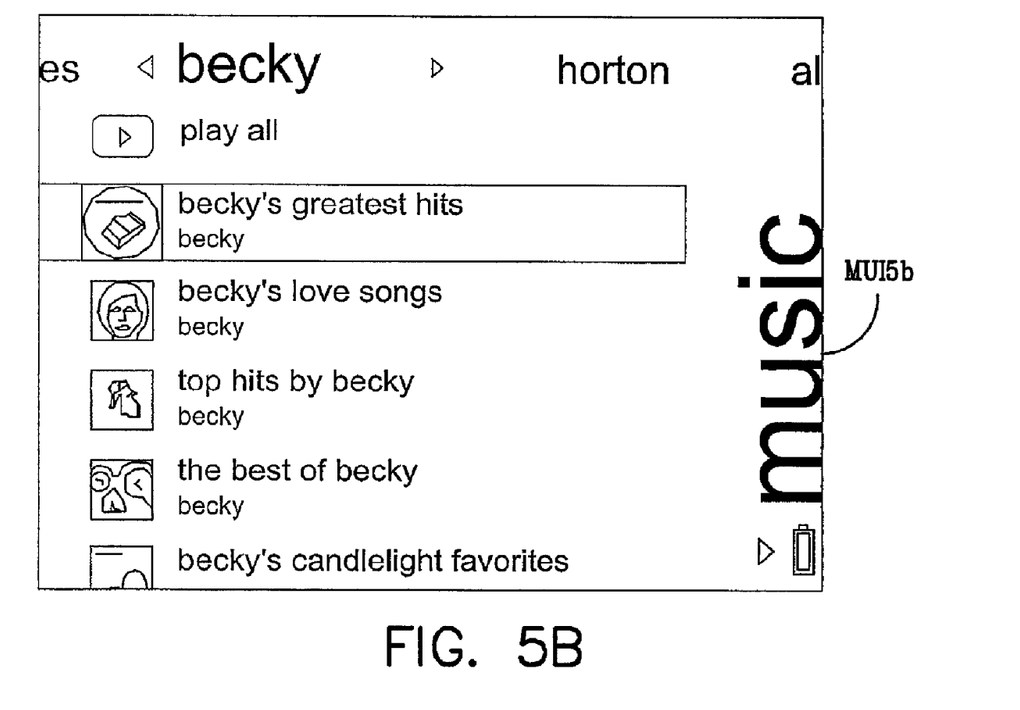

The Twist is illustrated in the exemplary screenshots MUI5a and MUI5b of FIGS. 5A-5B, respectively, showing how the items in the list of Artists of FIG. 5A become list headings of FIG. 5B after the user selects a list element, e.g., by clicking the OK button. In accordance with the invention, for anywhere in the library of objects being searched, when the user selects an item from a list, all of the objects, e.g., nouns, in that list become list headings. In one embodiment, nouns, but not verbs, become list headings. In another embodiment, the initial (default) item in every list is the first "noun" (if there are any) or the first "verb" (if there are no nouns). Verbs are actions that a user can take on the previously selected item, e.g., "playing an album," "adding a song to the Portable Playlist, etc.

There are cases where the list headings are implicitly defined by how the user reached the current screen. In the screens MUI6a and MUI6b of FIGS. 6A-6B, the list headings in the band of lists do not appear as list items because those list headings represent top level categories for a certain type of object being searched.

Figure 6A:
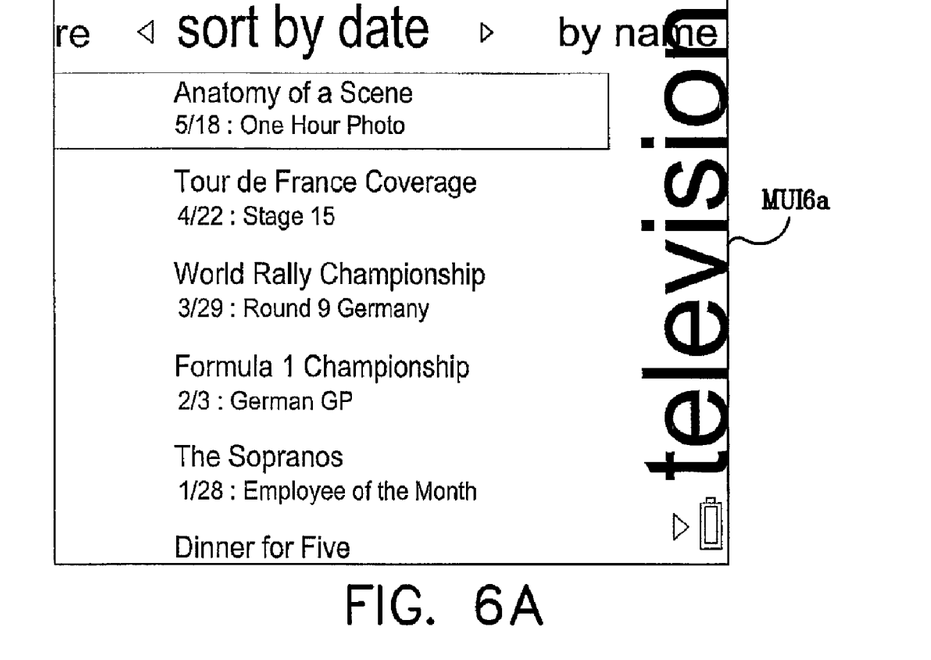
FIGS. 6A and 6B are exemplary screenshots of start locations for different kinds of content being searched according to the user interface of the invention.

In the first screen MUI6a of FIG. 6A, for instance, as a root menu, the header "TV: Sort by date" might be reached by clicking the START button, selecting "My TV" and then pressing OK. Since the initial context can be inferred by the user's selection of TV content, the initial list headings correspond to different ways of locating the desired TV content, e.g., sorted by date, by name, or by category.

Figure 6B:
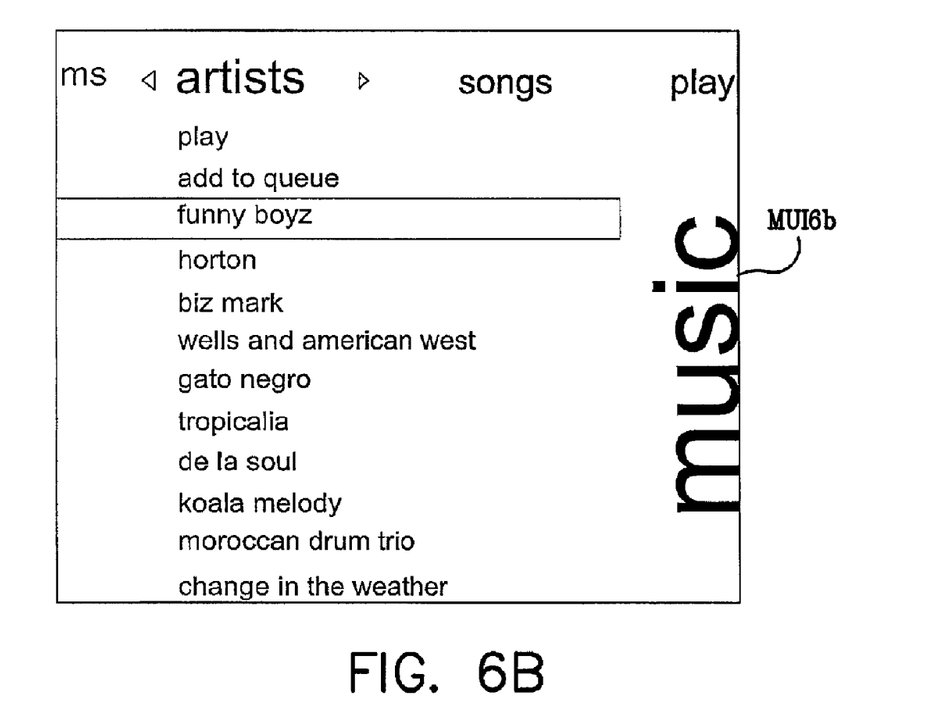

In the second screen MUI6b of FIG. 6B, "Artists" might be reached by clicking the OK button when "my Music" is selected in a Library screen. In this case, since it can be inferred that the context is music, not TV, the initial list headings correspond to the different ways that a user can browse the music library, e.g., by Genre, Artist, Album, Song or Playlist. These initial list headings, however, need not be displayed vertically since they serve as the initial top level drill down points.

In various embodiments, the list headings appear as a horizontal band across the top of the screen. In one embodiment, the currently selected list heading is displayed differently than the other headings, e.g., in a larger font, highlighted, bold, or otherwise emphasized.

Often, the complete text of a list heading (either the selected heading or one of the neighboring headings) will not fit in the space allotted it. In one non-limiting embodiment, in these cases, only a portion of the heading text is displayed. In a non-limiting embodiment, the last few displayed characters are faded with an alpha-ellipsis, or according to a similar effect. In a non-limiting exemplary implementation of the invention, for headings to the left of the current selection, the beginning of the text is truncated, helping the user discover that there is more off to the left.

When the user moves left and right through a band of lists, in one embodiment of the invention, the animation reinforces the horizontal motion. The current list control disappears, and then the list of headings moves to the left or right (e.g., the arrows stay in place, the moving headings are all in the smaller font, and the motion accelerates and then decelerates); finally the new list control appears (e.g., first the selection box appears and then the items appear from top to bottom).

In a non-limiting implementation, with respect to manipulating bands of lists, band of lists controls handle two button clicks: LEFT and RIGHT. UP, DOWN, OK and BACK can be handled by an active list control. For the LEFT button clicking the LEFT button shifts the current list in the band one place to the left. Pressing and holding the LEFT button causes a continuous shift through the band (e.g., not stopping to display a list control until the user released the button). For the RIGHT button, clicking the RIGHT button shifts the current list in the band one place to the right. Pressing and holding the RIGHT button causes a continuous shift through the band.

As mentioned, the invention also provides continuity in bands of lists. In one embodiment, after selecting any of the items in the Start screen and pressing OK, the initially selected list is the last list that the user selected in this band. For example, if the user browses through TV in "Sort by Date", the next time the user selects "My TV" from the Start screen and presses OK, the initial view will again be "Sort by Date". Remembering user browsing history like this is also used when browsing music, e.g., starting in Genres if that was the last place where the user browsed music. If the user brought up the band of lists by selecting a noun from a list control, e.g., by selecting an Artist named "Beck" from a list of artists or selecting "Odelay" from a list of Beck's albums, then the selected item becomes the initially selected list.

When moving left and right through a band of lists, the UI remembers the user's most recent selection in each list. If the user returns to a list, the initial selection is set to be the most recent one. For example, when browsing "Beck: Odelay," the user can move left and right to other Beck albums. If the user has selected "Devil's Haircut," which is the first song on album "Odelay", and then moves right to the "Sea Change" album, and then moves left again back to the "Odelay" album, "Devil's Haircut" is the current selection in the list control based upon that historical interaction with the "Odelay" album.

In one non-limiting embodiment, when the user presses the START button, this "stickiness" feature of the invention (remembering the user's interaction) is reset. For example, a user may select "play all" on "Beck: Odelay" and listen to the album. If the user then presses BACK, the user is taken back to "Beck: Odelay" and the sticky menus persist. If the user instead presses START, the user is taken to "Start" and the stickiness of the menus is reset.

There are multiple ways of implementing the present invention, e.g., an appropriate API, tool kit, driver code, operating system, control, standalone or downloadable software object, etc. which enables applications and services to use the rich navigation experience enabled by the systems and methods of the invention. The invention contemplates the use of the invention from the standpoint of an API (or other software object), as well as from a software or hardware object, such as a media player, that receives data, such as a media object, in accordance with the invention. Thus, various implementations of the invention described herein may have aspects that are wholly in hardware, partly in hardware and partly in software, as well as in software.

As mentioned above, while exemplary embodiments of the present invention have been described in connection with various computing devices and network architectures, the underlying concepts may be applied to any computing device or system in which it is desirable to search categorizable objects. For instance, the algorithm(s) and hardware implementations of the invention may be applied to the operating system of a computing device, provided as a separate object on the device, as part of another object, as a reusable control, as a downloadable object from a server, as a "middle man" between a device or object and the network, as a distributed object, as hardware, in memory, a combination of any of the foregoing, etc. While exemplary programming languages, names and examples are chosen herein as representative of various choices, these languages, names and examples are not intended to be limiting. One of ordinary skill in the art will appreciate that there are numerous ways of providing object code and nomenclature that achieves the same, similar or equivalent functionality achieved by the various embodiments of the invention.

As mentioned, the various techniques described herein may be implemented in connection with hardware or software or, where appropriate, with a combination of both. Thus, the methods and apparatus of the present invention, or certain aspects or portions thereof, may take the form of program code (i.e., instructions) embodied in tangible media, such as floppy diskettes, CD-ROMs, hard drives, or any other machine-readable storage medium, wherein, when the program code is loaded into and executed by a machine, such as a computer, the machine becomes an apparatus for practicing the invention. In the case of program code execution on programmable computers, the computing device generally includes a processor, a storage medium readable by the processor (including volatile and non-volatile memory and/or storage elements), at least one input device, and at least one output device. One or more programs that may implement or utilize the user interface techniques of the present invention, e.g., through the use of a data processing API, reusable controls, or the like, are preferably implemented in a high level procedural or object oriented programming language to communicate with a computer system. However, the program(s) can be implemented in assembly or machine language, if desired. In any case, the language may be a compiled or interpreted language, and combined with hardware implementations.

The methods and apparatus of the present invention may also be practiced via communications embodied in the form of program code that is transmitted over some transmission medium, such as over electrical wiring or cabling, through fiber optics, or via any other form of transmission, wherein, when the program code is received and loaded into and executed by a machine, such as an Erasable Programmable Read Only Memory (EPROM), a gate array, a programmable logic device (PLD), a client computer, etc., the machine becomes an apparatus for practicing the invention. When implemented on a general-purpose processor, the program code combines with the processor to provide a unique apparatus that operates to invoke the functionality of the present invention. Additionally, any storage techniques used in connection with the present invention may invariably be a combination of hardware and software.

While the present invention has been described in connection with the preferred embodiments of the various figures, it is to be understood that other similar embodiments may be used or modifications and additions may be made to the described embodiment for performing the same function of the present invention without deviating therefrom. For example, while exemplary network environments of the invention are described in the context of a networked environment, such as a peer to peer networked environment, one skilled in the art will recognize that the present invention is not limited thereto, and that the methods, as described in the present application may apply to any computing device or environment, such as a gaming console, handheld computer, portable computer, media player, etc., whether wired or wireless, and may be applied to any number of such computing devices connected via a communications network, and interacting across the network. Furthermore, it should be emphasized that a variety of computer platforms, including handheld device operating systems and other application specific operating systems are contemplated, especially as the number of wireless networked devices continues to proliferate.

While exemplary embodiments refer to utilizing the present invention in the context of navigating music, the invention is not so limited, but rather may be implemented in connection with any kind of objects capable of being categorized, such as any kind of media. For instance, DVDs, TV broadcasts, word processing files, spreadsheets, movies, music, retail products, etc. can all be searched according to the present invention. By categorizing retail products, for example, into electronics, furniture, tools, etc., a retail Web site could enable a user to "drill down twist" according to the invention such that the user preserves context of a parent list while more specifically arriving at a product of interest. Still further, the present invention may be implemented in or across a plurality of processing chips or devices, and storage may similarly be effected across a plurality of devices. Therefore, the present invention should not be limited to any single embodiment, but rather should be construed in breadth and scope in accordance with the appended claims.

What is claimed is:

1. A handheld media storage and retrieval device, comprising:
   a display device displaying a display screen for viewing media content stored on the handheld media storage and retrieval device, the display screen displaying only a hierarchical menu comprising only two hierarchical levels of a plurality of hierarchical levels of the stored media content;
   a user input mechanism on the handheld media storage and retrieval device, the user input mechanism accepting user commands and information;
   a first input component for navigating initial headers representing a first one of the plurality of hierarchical levels and organized in a first orientation displayed on the display screen of the handheld media storage and retrieval device, wherein each of said initial headers includes an association with a child list, whereby said initial headers form a band of lists represented by the initial headers;
   a second input component for navigating a first list of elements representing a second one of the plurality of hierarchical levels and organized in a second orientation different from the first orientation, the first list of elements associated with a currently selected header of the initial headers displayed as a child list for the currently selected header; and
   a selection component for receiving a selection of one element of the first list of elements,
   wherein, upon the selection of the one element of the first list of elements, the first list of elements become new headers and at least some of the first list of elements are displayed according to the first orientation as new headers of a new screen, the new headers including the one selected element as a new currently selected header of the new screen and displayed in an order determined by the selection, and a second list of elements representing a third one of the plurality of hierarchical levels is displayed in the second orientation, the second list associated with the new currently selected header as a child list for the new currently selected header, the new screen displaying only the new headers and the second list, and wherein navigating and selecting is repeated until a particular hierarchical level comprising atomic elements is displayed in the second orientation, wherein upon selection of an atomic element of the atomic elements, the display screen displays only the particular hierarchical level in the first orientation with the selected atomic element as an active header and an information display box containing information about the selected atomic element.

2. The handheld media storage and retrieval device according to claim 1, wherein the currently selected header is emphasized.

3. The handheld media storage and retrieval device according to claim 1, wherein said first orientation is substantially orthogonal to said second orientation.

4. The handheld media storage and retrieval device according to claim 3, wherein one of (A) said first orientation is horizontal and said second orientation is vertical and (B) said first orientation is vertical and said second orientation is horizontal.

5. The handheld media storage and retrieval device according to claim 1, wherein for a header located to the left of the currently selected header, the beginning of the header is truncated.

6. The handheld media storage and retrieval device according to claim 1, wherein said navigating initial headers with said first input component includes moving to a next initial header according to the first orientation and thereby displaying a child list for that next initial header.

7. The handheld media storage and retrieval device according to claim 1, wherein said band of lists is arranged horizontally as a circular list.

8. The handheld media storage and retrieval device according to claim 1, wherein when the selection of the one element of the first list of elements is received by the selection component, at least some of the first list of elements are displayed according to the first orientation as the new headers of the new screen, wherein text corresponding to the at least some of the first list of elements include nouns and verbs and wherein only nouns included in the text corresponding to the at least some of the first list of elements are displayed as the new headers.

9. The handheld media storage and retrieval device according to claim 1, wherein said first input component receives LEFT and RIGHT inputs and said second input component receives UP and DOWN inputs and said selection component receives an OK input.

10. The handheld media storage and retrieval device according to claim 1, wherein an initial location of an input position of the second input component is determined based upon user browsing history.

11. The handheld media storage and retrieval device according to claim 10, wherein the initial location of the input position of the second input component is determined based upon most recent selection from the second list of elements.

12. The handheld media storage and retrieval device according to claim 10, wherein the user browsing history is reset when a root menu of a user interface is selected.

13. A computer-implemented method for navigating a set of recordings stored on a handheld storage and retrieval device on a display of the handheld storage and retrieval device, comprising:
   on the display of the handheld device, presenting an initial screen for displaying only a hierarchical menu comprising only two hierarchical levels of a plurality of hierarchical levels of the set of recordings, the initial screen having initial headers representing a first one of the plurality of hierarchical levels and oriented according to a first orientation, said initial headers providing top-level categories for filtering the set of recordings, wherein each of said initial headers includes an association with a child list, whereby said initial headers form a band of lists represented by the initial headers;
   navigating the initial headers according to the first orientation;
   presenting a list of elements representing a second one of the plurality of hierarchical levels oriented according to a second orientation different from the first orientation, the list of elements associated with a currently selected header of the initial headers as a child list for the currently selected header;
   navigating the list of elements according to the second orientation;
   selecting an element from the list of elements;
   in response to said selecting the element, presenting a new screen having the list of elements as element headers displayed according to the first orientation, the element headers including the selected element as a new currently selected header of the element headers and displayed in an order determined by the selecting; and presenting a second list of elements representing a third one of the plurality of hierarchical levels and associated with the new currently selected header of the element headers as a child list for the new currently selected header, the second list of elements displayed according to the second orientation, the new screen displaying only the element headers and the second list of elements; and repeating navigating and selecting until a particular hierarchical level comprising atomic elements is displayed in the second orientation, wherein upon selection of an atomic element of the atomic elements, the display screen displays only the particular hierarchical level in the first orientation with the selected atomic element as an active header and an information display box containing information about the selected atomic element.

14. A method according to claim 13, wherein the currently selected header of the element headers of the new screen is the header based upon the selected element.

15. A method according to claim 13, wherein the currently selected header is emphasized relative to any unselected header.

16. A method according to claim 13, wherein said first orientation is substantially orthogonal to said second orientation.

17. A method according to claim 16, wherein one of (A) said first orientation is horizontal and said second orientation is vertical and (B) said first orientation is vertical and said second orientation is horizontal.

18. A method according to claim 13, wherein said navigating the initial headers according to the first orientation includes moving to a next header according to the first orientation and thereby displaying a child list for that next header.

19. A method according to claim 13, wherein the navigating the list of elements includes inputting a location of an input position on the list of elements and wherein a starting location on the list of elements is determined based upon user browsing history.

20. A computer readable storage medium comprising computer executable modules having computer executable instructions that, when executed, carry out the method of claim 13.

21. A computing device comprising a display, an input mechanism, and means for performing the method of claim 13.

22. A handheld media storage and playback device, comprising:
a handheld display for selecting at least one stored media for playback; and
a computer readable storage medium comprising computer executable modules comprising computer executable instructions which when executed by a processor perform the method of claim 13.

23. A handheld media storage and playback device according to claim 22, wherein the currently selected header is emphasized relative to any unselected header.

24. A handheld media storage and playback device according to claim 22, wherein said first orientation is substantially orthogonal to said second orientation.

25. A handheld media storage and playback device according to claim 22, wherein the initial headers are navigated according to the first orientation and said navigating the initial headers includes moving from the currently selected header to a next initial header according to the first orientation and thereby displaying a child list for that next header, which is the new currently selected header.

26. A handheld media storage and playback device according to claim 22, wherein said selecting the element from the list of elements includes navigating the list of elements by inputting a location of an input position on the list elements, wherein a starting location on the list of elements is determined based upon user browsing history.

27. A handheld recording storage and retrieval device for navigating a set of stored recordings of on a display of the handheld recording storage and retrieval device, comprising:
a handheld display for presenting a display screen for initially displaying only two hierarchical levels of a plurality of hierarchical levels of the set of stored recordings, the display screen having initial headers representing a first one of the plurality of hierarchical levels and oriented according to a first orientation, said initial headers providing top-level categories for filtering the set of stored recordings, wherein each of said initial headers includes an association with a child list, whereby said initial headers form a band of lists represented by the initial headers;

means for navigating the initial headers according to the first orientation;

the handheld display presenting a list of elements representing a second one of the plurality of hierarchical levels oriented according to a second orientation different from the first orientation, the list of elements associated with a currently selected header of the initial headers as a child list for the currently selected header;

means for navigating the list of elements according to the second orientation;

means for selecting an element from the list of elements;

means for presenting a new screen having the list of elements as element headers displayed according to the first orientation in response to said selecting the element from the list of elements, the element headers including the selected element as a new currently selected header of the element headers and displayed in an order determined by the selecting;

means for presenting a second list of elements representing a third one of the plurality of hierarchical levels and associated with the new currently selected header of the element headers as a child list for the new currently selected header, the second list of elements displayed according to the second orientation, the new screen displaying only the element headers and the second list of elements; and means for repeating navigating and selecting until a particular hierarchical level comprising atomic elements is displayed in the second orientation, wherein upon selection of an atomic element of the atomic elements, the display screen displays only the particular hierarchical level in the first orientation with the selected atomic element as an active header and an information display box containing information about the selected atomic element.

28. A handheld recording storage and retrieval device according to claim 27, wherein said first orientation is substantially orthogonal to said second orientation.

29. A handheld recording storage and retrieval device according to claim 27, further including means for navigating the initial headers according to the first orientation and said means for navigating the initial headers includes means for moving to a next header according to the first orientation and corresponding means for displaying a child list for that next header.

* * * * *